Sept. 19, 1933.   T. W. PAUL   1,927,804
PITMAN
Filed July 14, 1932
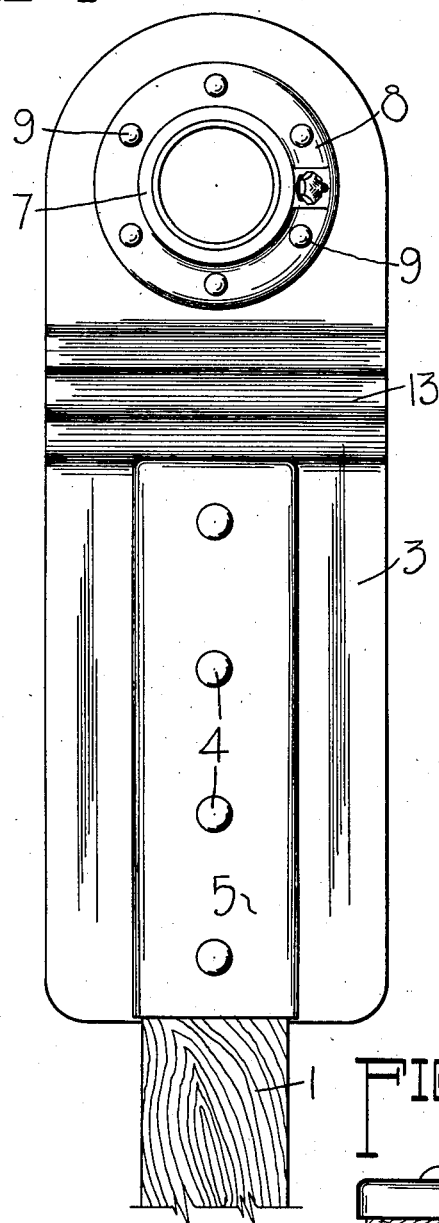
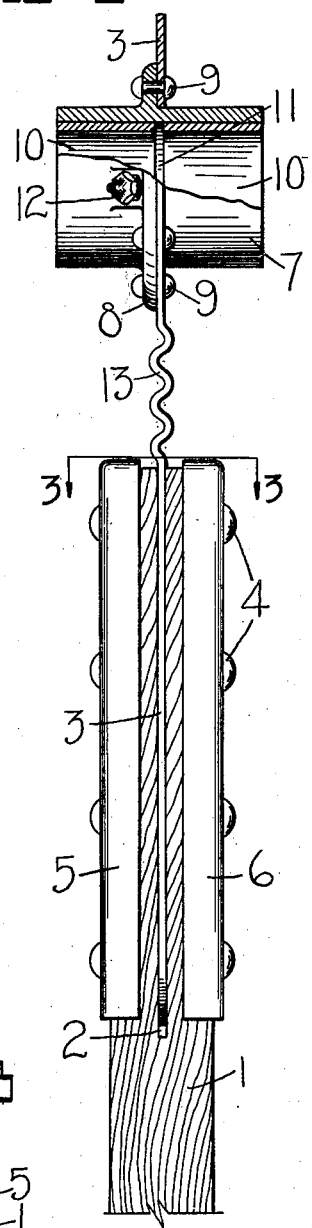
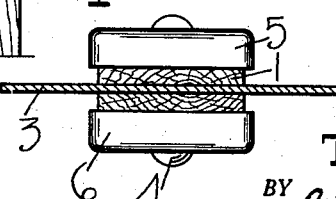
INVENTOR.
TALBERT W PAUL.
BY W.C. Jurdinston
ATTORNEY.
WITNESS.
Edward Melin.

Patented Sept. 19, 1933

1,927,804

UNITED STATES PATENT OFFICE

1,927,804
PITMAN

Talbert W. Paul, Kansas City, Kans., assignor to Deere & Company, Moline, Ill., a corporation of Illinois Application July 14, 1932. Serial No. 622,403

2 Claims. (Cl. 74—17)

My invention relates to pitman connections particularly as applied to mowing machines or grain harvesters, and has for its object to provide a connection by which the pitman can be attached to the crank wheel of machines of the type stated, such attachment having a resiliency to materially lessen the violence of the thrust of the pitman on the crank pin and also on the pitman connection to the knife head.

It is well known that the greatest detriment to continuous perfect and smooth operation of the cutting mechanism is in the wear of the pitman connections, in either a mower or a grain harvester, due to constant change in the perpendicular relation of the pitman to the drive shaft when a machine employing such parts is in operation, consequently a degree of resiliency is desirable in the pitman connections more particularly with the crank wheel to the crank pin to which the driven end of the pitman is connected, and this resiliency I provide as illustrated and hereinafter explained.

Referring to the drawing in which similar numerals identical parts—

Figure 1 is a side elevation of my invention applied to a pitman;

Figure 2 is a plan view of Figure 1 with part of the bearing sleeve broken away; and, Figure 3 is a section on the line 3—3 of Figure 2.

The main body of the pitman 1 is made of wood and is provided with a longitudinal slot 2 at its upper end in which is inserted a plate 3 secured therein by rivets 4 which extend through plates 5 and 6 located respectively on opposite sides of the pitman. The plates 5 and 6 have their sides bent to embrace the pitman and their upper ends bent to partly cover the end of the pitman. In the upper end of the plate 3 is provided a hole in which is inserted the bearing sleeve 7 for a crank pin of a mower or other machine to which my pitman is applicable. The sleeve 7 extends an equal distance on each side of the plate 3 and is rigidly secured to a flange 8, integral with the sleeve, by suitable rivets 9. A two part bushing 10 is within the sleeve with a channel 11 between the ends of the parts as a reservoir for a lubricant supplied through a nipple and vent 12. The sides of the plate 3, for its length, extend equidistant beyond the sides of the pitman and parallel therewith and its upper end is semicircular concentric with the sleeve 7.

The plate 3 is corrugated between the flange 8 of the sleeve 7 and the end of the pitman, the corrugations 13 extending the width of the plate 3 and providing a degree of resiliency which materially reduces the effect of the shock occurring at the termination of the pitman movement in either direction. Resilient connections between pitmen and bearing sleeves are well known. I believe, however, that my invention is a distinct advance in the art and is a simple, economical and effective improvement particularly adapted to the purpose for which it was designed.

What I claim is:—

1. A pitman connection comprising a body portion, a metallic plate secured to one end of said body portion, a cylindrical bearing sleeve fixed to the free end of said plate, the axis of the bearing being disposed perpendicular to the plane of the plate, that portion of the plate between the end of the body portion of the pitman and the adjacent side of the bearing being corrugated, the corrugations running perpendicular to the axis of said body portion, whereby the flexibility of said plate in a plane containing the axes of the bearing and the body portion is increased and the plate is rendered slightly yieldable in the direction of the axis of the body portion under load without materially affecting the rigidity of the plate against movement of the bearing relative to the body portion in a plane perpendicular to the axis of the bearing in a direction perpendicular to the axis of said body portion.

2. A pitman comprising a body portion, a metallic plate secured to one end of said body portion and having a circular opening in its free end, a cylindrical bearing sleeve projecting into said opening and having an external circumferential flange bearing upon said plate, means for fixing said plate to said flange, that portion of the plate between the end of the body portion of the pitman and the adjacent side of the flange being corrugated, the corrugations running perpendicular to the axis of said body portion, whereby the flexibility of said plate in a plane containing the axes of the bearing and the body portion is increased and the plate is rendered slightly yieldable in the direction of the axis of the body portion under load without materially affecting the rigidity of the plate against movement of the bearing relative to the body portion in a plane perpendicular to the axis of the bearing in a direction perpendicular to the axis of said body portion.

TALBERT W. PAUL.